J. F. BOYNTON.
Evaporating Pan.
No. 59,349. Patented Nov. 6, 1866.
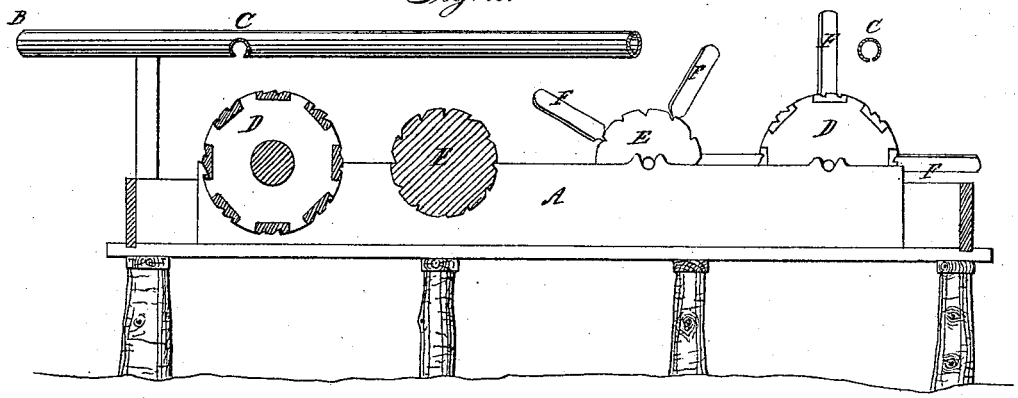
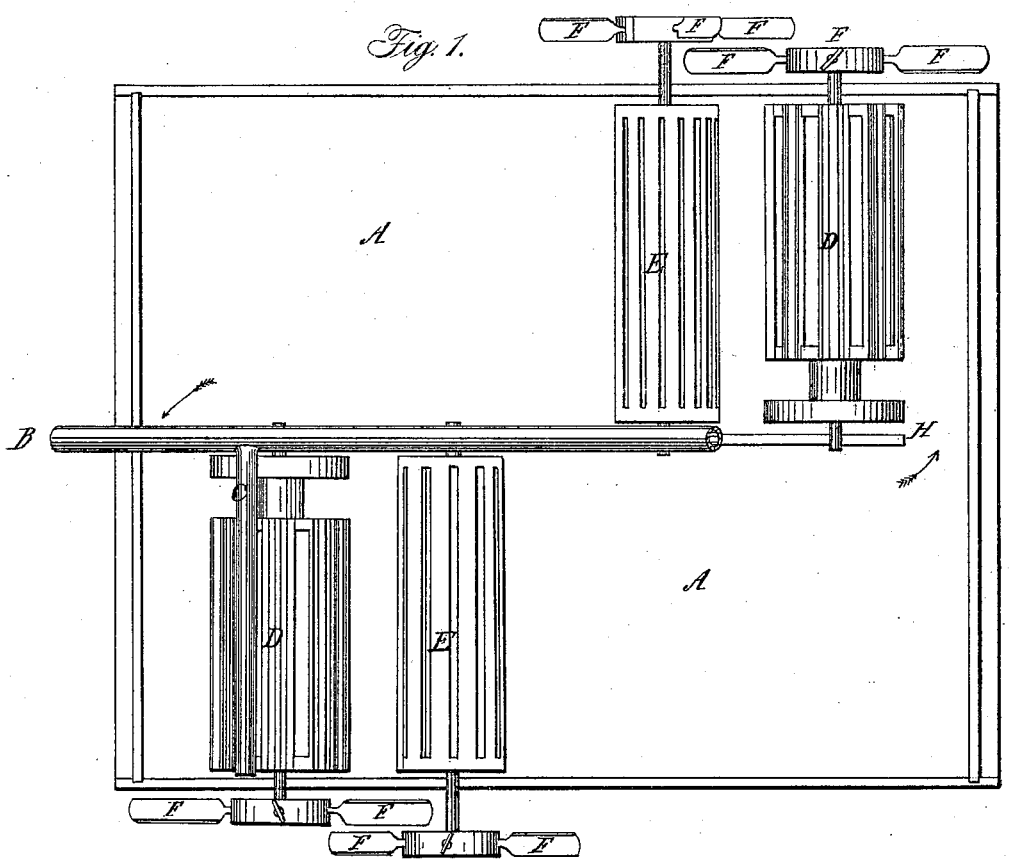
Witnesses:
Inventor:

UNITED STATES PATENT OFFICE.

JOHN F. BOYNTON, OF SYRACUSE, NEW YORK.

IMPROVED VAT FOR EVAPORATING SALT-WATER.

Specification forming part of Letters Patent No. 59,349, dated November 6, 1866.

*To all whom it may concern:*

Be it known that I, JOHN F. BOYNTON, of Syracuse, in the county of Onondaga, in the State of New York, have invented a new and useful Method of Increasing the Evaporation of Water from Solar-Salt Vats, and thereby lessening the expense of the manufacture of solar salt; and I do hereby declare that the following is a full and exact description thereof, reference being had to the accompanying drawings, and to the letters of reference marked thereon.

To enable others skilled in the art to make and use my invention, I will proceed to describe its construction and operation.

Figure I represents the salt-vat with its evaporating apparatus, as seen from above; Fig. II, sectional view of the same.

I run the lags along in the ground which convey the salt-water the whole length of the vat A, or in pipes along the side of the vat near the top, or conveyed over the vats lengthwise by a pipe, B, so that water can be let out of the pipe in jets C into the vat below, or with small tubes or spouts from the side pipes, so arranged that they can jet into the vat, or upon water-buckets D and E on rollers suspended across the vat A. These rollers are made to revolve by the water from the jets falling into the buckets connected with or on the rollers D and E. The lower sides of the rollers dipping into the water as they revolve will continually multiply the surface of the water from the vat, bringing it in contact with the atmosphere.

It is well known that the evaporation of water depends upon three things—the amount of surface of water presented to the air, the temperature of both, and the amount of moisture the atmosphere contains when the large surface of water is presented.

It can be plainly seen that these rollers when revolving would be continually wet, and when having revolved a sufficient length of time will have presented to the atmosphere a surface equal to the entire surface of the water in the vat A, however large the vat may be. Again, the water being let into the vats through a series of jets, C, greatly multiplies its surface in contact with the air while passing through it, while falling into the buckets to turn the rollers D and E.

By this mode and arrangement I cause the water by its weight to perform mechanical operations, thereby facilitating its own evaporation, as above specified.

To support one end of these rollers D and E, I place nearly the whole length of the vat A one or more central boards, H, setting on edge as high as the sides of the vat A, these boards serving a double purpose—first, for supporting the inner ends of a double set of rollers, or for a central bearing of a set of single or long rollers; second, as one set of these double rollers are designed to roll in one direction and the other in the opposite, the water would have a tendency to move in one direction on one side of the central boards and in the opposite upon the other when the rollers are in motion.

If the central boards did not reach the ends of the vat by sixteen feet (more or less) it would give sufficient room for the water to pass freely around its ends from one half the vat to the other, as the direction and momentum of water are changed while in circulation. On the ends of the journals supporting these rollers I propose to place arms for the support of fans F F, placed at favorable angles, that the wind in blowing against them may cause them to roll or change their positions backward or forward, as the wind may happen to blow, thus keeping a fresh wet surface in contact with the air when no water is running from the jets C.

When there was not sufficient salt-water in the vat A it could be let in through the jets upon the buckets and move the rollers, or when there was sufficient water in the vat the water could be shut off and the rollers moved by the wind.

By graduating the flow of water it could be so arranged that the winds and water could act alternately, or, both operating at the same time, their conflicting action would produce changes in the position of the wheels D D or cylinders.

In the present mode of conveying the water into the vats the water passes through a large wooden tube up through the bottom of the vat, and the mechanical power that forces it there is only used for filling the vat, and is not arranged so as to assist in its evaporation.

In connection with the above arrangement I shall have grooves in the surface of the rollers D and E in form of small buckets upon the surface of an overshot wheel. These grooves serve two purposes—first, acting as buckets for retaining more water on one side of the wheel than the other to give it revolution; second, as increasing the surface of the wheel, thereby insuring a greater evaporating surface.

Likewise to increase the surface of these rollers and increase its capacity for retaining water to produce revolution I bore the sides or staves of the rollers D and E full of holes not passing entirely through them. The staves of the rollers in which the grooves are made are placed a short distance apart, so they may become wet on their inner as well as their outer surfaces, giving the air free circulation through them, and holes being made through the heads of the rollers facilitates the same atmospheric action and increases the surface. These rollers are to be painted black, thereby causing a greater absorption of heat.

The above arrangement would be a more profitable investment for the manufacture of solar salt than the same amount of money expended in the ordinary way.

What I claim as new, and desire to secure by Letters Patent, is—

1. The central boards, as specified.
2. The rollers with multiplied surface.
3. The dark color of the rollers for the absorption of heat, as herein specified.
4. The arms with fans upon the rollers.
5. The arrangement which causes the water by its gravity to work its own evaporation, substantially as described.

JOHN F. BOYNTON.

Witnesses:
B. W. SPEARS,
J. M. GRISWOLD.